UNITED STATES PATENT OFFICE.

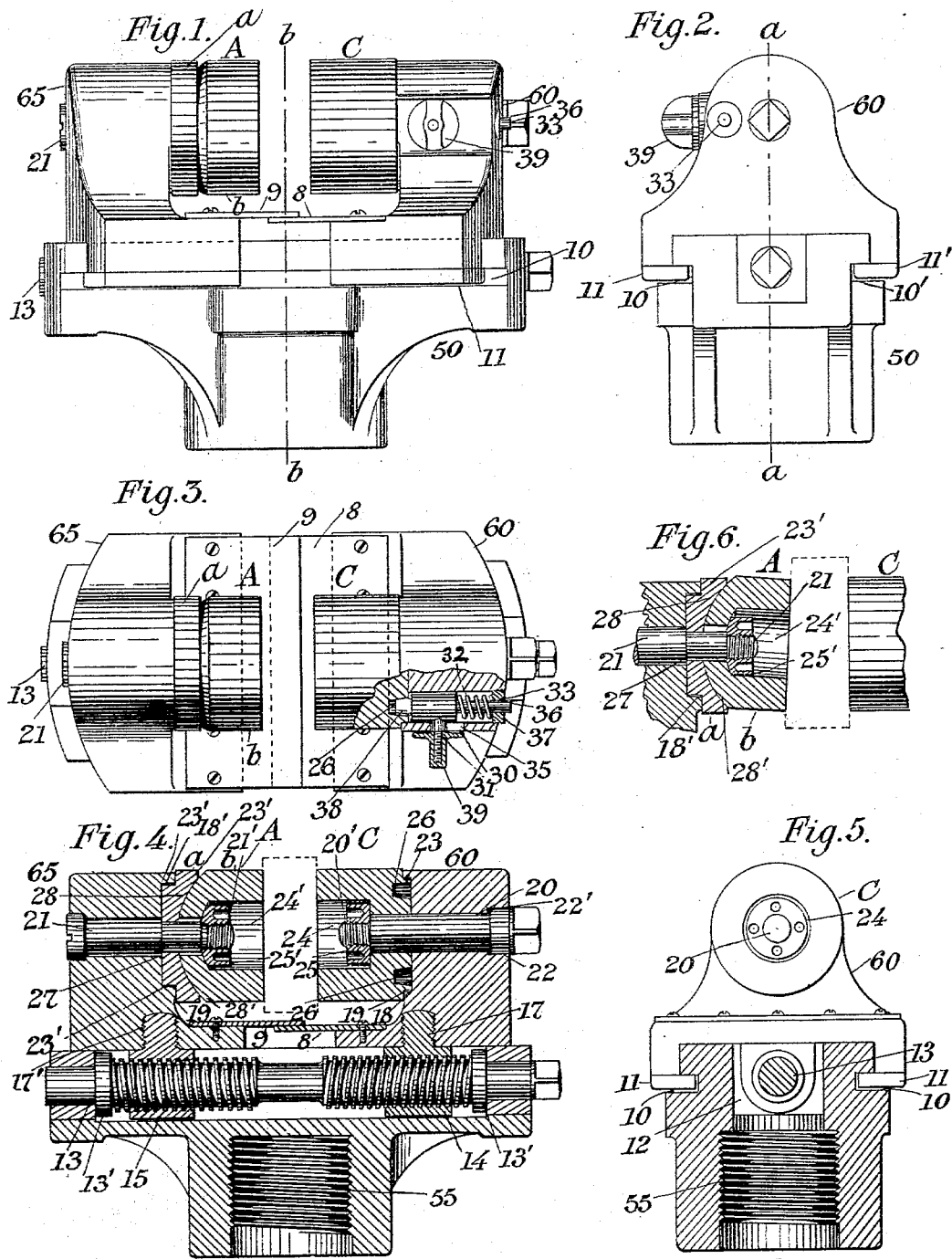

WILLIAM W. TUCKER, OF HARTFORD, CONNECTICUT.

CHUCK.

SPECIFICATION forming part of Letters Patent No. 546,439, dated September 17, 1895.

Application filed May 11, 1895. Serial No. 548,949. (No model.)

*To all whom it may concern:*

Be it known that I, WILLIAM W. TUCKER, a citizen of the United States, residing at Hartford, in the county of Hartford and State of Connecticut, have invented certain new and useful Improvements in Chucks, of which the following is a specification.

This invention relates to chucks of that class known as "universal" chucks, and is adapted for attachment to lathes or similar machines; and the object of the invention is to provide a chuck which will be simple in construction and easily operated and which will permit the simultaneous longitudinal movement of the clamping-jaws and the rotation of the same, together with the automatic universal movement of one of the clamping-jaws relative to the other jaw, whereby said chuck is adapted for use upon articles of tapering or irregular shapes—such as drop forgings or globe-valves—so that the same will be tightly clamped between the jaws of the chuck against displacement thereof by the working tools.

In the drawings accompanying and forming part of this specification, Figure 1 is a side elevation of this improved universal chuck. Fig. 2 is a right-hand end view of the chuck shown in Fig. 1. Fig. 3 is a top plan view of the chuck, a part thereof being broken away to show the locking mechanism for the revolving head. Fig. 4 is a longitudinal vertical section in line $a\,a$, Fig. 2, a part thereof being shown in full lines, and also showing a piece of work held between the clamping-jaws. Fig. 5 is a transverse vertical section in line $b\,b$, Fig. 1, a part thereof also being shown in full lines. Fig. 6 is a view, partly in section and partly in full lines, of the clamping-jaws shown as holding a piece of work between them of irregular shape, the section of said figure showing the automatically universally-movable clamping-jaws, taken in line $a\,a$, Fig. 2.

Similar characters represent like parts in all the figures of the drawings.

This improved chuck consists, in the preferred form thereof herein shown and described, of a suitable base or body, (designated, generally, as 50,) having the usual means of attachment to the spindle of the lathe or similar machine, and shown herein as an interiorly-screw-threaded sleeve 55.

The base or body of the chuck is provided with grooved side rails 10 and 10' of any suitable construction, on which the clamp-carrying heads (designated, generally, as 60 and 65) are adapted to reciprocate. These heads 60 and 65 are fitted to slide on said base or body and are held thereon by means of straps 11 and 11', attached to the overlapping sides of the head by means of screws or in any suitable way, the inner edges of said straps fitting into the grooves of the side rails. Overlapping projecting plates 8 and 9 are attached, by any suitable means, to the base part of the sliding heads, and prevent the work falling between the heads below said plates and into the recess of the base 50 when the clamping-jaws are slightly released to remove the work. The base or body 50 is longitudinally recessed, as at 12, and adapted to receive a bolt 13, provided with right and left hand screw-threads, said bolt being journaled in the ends of the base or body 50 and adapted to rotate therein. Suitable collars 13' are preferably integrally connected to the bolt adjacent the inner sides of the ends of the body, whereby said bolt is prevented from sliding in its journal-bearings. One end of the bolt is also provided with a squared head, adapted to receive a wrench or handle to rotate the same.

Interiorly-screw-threaded sleeves, as 14 and 15, are adapted to reciprocate on said bolt toward or from each other when the same is actuated and are provided with suitable means of connection to the reciprocating clamp-carrying heads, as herein shown, with exteriorly-screw-threaded transverse stems 17 and 17', preferably integrally connected to said sleeves at the upper part thereof, and which screw into the under side of the clamp-carrying heads 60 and 65, whereby said heads will be moved toward or away from each other when said screw-threaded bolt is actuated.

The inner opposing faces of the clamp-carrying heads 60 and 65 are provided with circular recesses 18 and 18', having shoulders 19, in which circular recesses the clamping-jaws A and C, hereinafter described, are adapted to rotate, said jaws being held in said recesses against lateral movement thereof by means of said shoulders 19. These clamp-carrying heads are longitudinally bored at or near the centers thereof, forming journal-bearings adapted to receive bolts 20 and 21, having screw-threaded ends 20' and 21', one of said bolts, as 20, being provided with a squared head adapted to receive a handle or wrench, if desired, for rotating the clamping-jaws. A collar 22, integrally connected to the squared head of the bolt on the inner side thereof, is adapted to fit within a recess 22' of larger diameter than the longitudinal bore of the head, whereby said bolt is prevented from projecting too far beyond the inner face of the head. A clamping-jaw C, provided with a circular projecting plate 23, preferably integrally connected therewith, of smaller diameter than the jaw proper and having recesses 26 in said circular plate, for the purpose hereinafter described, is adapted to fit within the circular recess 18 of the head 60, the edge of the circular projecting plate being in frictional contact with the shoulders 19 of said head. This clamping-jaw C is provided on its inner clamping face with a circular recess 24, of any suitable depth, adapted to receive a nut 25. Said clamping-jaw is longitudinally bored at or near the center thereof and adapted to receive the projecting end of the bolt 20 on which it is adapted to rotate. A circular nut 25, provided with suitable pin-holes for the proper turning of said nut, is turned onto the screw-threaded end of said bolt, said nut fitting within the recess 24 of the clamping-jaw, whereby said jaw is held in rotatable frictional contact with the head 60.

The other clamping-jaw (designated, generally, as A) consists of two members $a$ and $b$, the member $a$ being preferably of less cross-sectional area in the longitudinal direction of the chuck than the other clamping-jaw C, and comprises a circular projecting plate 23', preferably integrally connected therewith and substantially similar to the projecting circular-plate 23 of the clamping-jaw C, and is adapted to rotate in the circular recess 18' of the head 65 and abut against the shoulders 19 of said head, said member also having a circular concave recess 28. This concave member $a$ is also bored concentric to the bore of the head 65 and is adapted to rotate on the bolt 21, which projects through said head 65. The bore of this member $a$ is, however, preferably of somewhat smaller diameter than the bore of the head and the bolt is likewise constructed of different diameters and adapted to fit these respective bores, forming thereby a shoulder 27, against which the face of said circular plate 18', adjacent its bore, is adapted to abut. The other member $b$ of the clamping-jaw A has a circular convex face 28', adapted to fit into and form frictional contact with the concave face 28 of the member $a$, said member $b$ being likewise bored concentric to the bore of the concave member $a$ and adapted to fit onto the projecting end of the bolt 21. This member $b$ is also provided with a recess 24', substantially similar to the recess 24 of the jaw C, the inner face of said recess, however, being concave to substantially the same degree as the face 28' thereof is convex. A circular nut 25', also provided with a convex face, is adapted to be turned onto the screw-threaded end of the projecting bolt 21 by means of its pinholes, whereby said convex member $b$ is held in automatically universally-movable frictional contact with the concave member $a$ of the clamping-jaw A and adapted to rotate therewith. The diameter of the bore of the member $b$ is, however, somewhat larger than the diameter of the bore of the member $a$ and of the bolt on which it rotates, to permit said member $b$ to adjust itself automatically relatively to the member $a$ and the oppositely-opposing jaw C, to clamp work of irregular or tapering shape, and thereby constitute, in connection with said jaw C, a universal clamping-chuck, having an automatically universally-movable jaw, somewhat similar to a ball-and-socket joint.

One side of one of the reciprocating clamp-carrying heads, and herein shown as the head 60, is provided with a recess adapted to receive a locking device of any suitable construction adapted for the purpose herein set forth. The locking device herein shown comprises a bolt 30, having a transverse screw-threaded stem 31, projecting through a slot 35 in said head. The bolt is also provided with a spindle 33 on the rear end thereof, projecting through an aperture 36 in the end of the head. An exteriorly screw-threaded nut or collar 37, having an aperture through its center for the reception of the spindle 33, is turned into a recess in the head 60 of somewhat larger diameter than the bolt-receiving recess, and the inner face of said nut or collar is adapted to receive one end of a spiral spring 32, the other end thereof pressing against the inner face of the bolt 30 to throw the same forward. The bolt 30 is also provided with a tongue 38, adapted to project into recesses 26 in the rear face of the rotatable clamping-jaw and thereby hold the same against rotation. Any number of these recesses may be provided, as desired. A thumbscrew 39 is turned onto the transverse stem of the bolt and is adapted to work said stem in the slot 35 of the head, whereby the tongue of said bolt can be retracted from its recess in the rotatable clamping-jaw and the same rotated any desired distance.

In the use of this improved chuck when it is desired to operate upon a piece of work—for instance, a globe-valve—the same is placed between the inner faces of the clamping-jaws and the heads moved toward each other by means of the right and left hand screw-threaded bolt until such jaws are firmly clamped against the faces of the work. Should the piece of work not be perfectly regular, the clamping member b will adjust itself automatically on its axis to conform to the irregular shape of the work and thereby permit the same to have a firm clamping-face against the work, as shown in Fig. 6. The spindle of the lathe is then operated, the chuck revolved, and the work on the globe-valve can be quickly and easily done without danger of displacing the same between the clamping-jaws. When it is desired to rotate the valve to present another face or portion thereof to the drill or other tool, the bolt 30 is withdrawn from the recess in the rotatable jaw by means of the thumb-screw and the clamping-jaws rotated any desired distance, with the work clamped tightly between them. When the work has been rotated to its proper place, the thumb-screw is released and the bolt permitted to slip into another recess in the clamping-jaw. When the work has been completed, the right and left hand screw-threaded bolt is turned in a direction reverse to the direction in which it was turned to clamp the jaws, whereby the jaws will move apart and permit the work to be released therefrom.

Having thus described my invention, I claim—

1. In a chuck of the class described, the combination with two reciprocatory sliding heads; a rotatable clamping-jaw carried by one of said heads; a clamping-jaw carried by the other of said heads, and embodying a rotatable member, rotatable relatively to its carrying head, and an automatically and universally adjustable, rotative member, adjustable on its axis relatively to, and rotatable with, its companion member; and a locking device for preventing the rotation of said jaws, substantially as described.

2. In a chuck of the class described, the combination with two reciprocating heads carrying clamping-jaws rotatable thereon, one of said jaws consisting of a member having a circular, concave face and a member having a circular, convex face adapted to form frictional contact with said concave face, and means for holding said members in frictional contact with each other to permit said convex member to be automatically, universally movable on its axis, relative to the concave face of its adjacent member, and to the other jaw, whereby said jaws are adapted to clamp an irregular piece of work, substantially as described.

3. In a chuck of the class described, the combination with two reciprocating heads; of bolts extending therethrough; longitudinally-bored clamping-jaws carried by said heads and adapted to rotate on said bolts, one of said jaws consisting of a concave member and a convex member, the convex face of one member being adapted to form frictional contact with the concave face of the other member, and the bore thereof being of larger diameter than the bore of the concave member, whereby it is adapted to be automatically, universally movable on its axis, relative to the concave member and to the other clamping-jaw, substantially as described.

4. In a chuck of the class described, the combination with two reciprocating heads; of bolts extending therethrough; longitudinally-bored clamping-jaws carried by said heads and adapted to rotate on said bolts, one of said jaws consisting of a concave member and a convex member, the convex face of one member being adapted to form frictional contact with the concave face of the other member, and the bore thereof being of larger diameter than the bore of the concave member, said convex member being also provided with a recess having a concave inner face; and a locking device, provided with a convex face adapted to engage the concave face of the recess for engagement with the bolt, whereby said convex member is automatically, universally movable relative to said concave member and to the other jaw, substantially as described.

5. In a chuck of the class described, the combination with two reciprocatory sliding heads having circular recesses in their opposing faces; a rotatable clamping-jaw carried by one of said heads and having a circular projecting-plate adapted to fit said recess and rotatable therein; and a jaw carried by the other of said heads, and embodying a rotatable member having a circular projecting-plate adapted to fit the circular recess of the head and rotatable therein, and an automatically and universally adjustable, rotative member, adjustable relatively to, and rotatable with its companion member, substantially as described.

6. In a chuck of the class described, the combination with two reciprocating-heads; a rotatable clamping-jaw carried by one of said heads; and a clamping-jaw carried by the other of said heads, and embodying a rotatable member, and an automatically and universally adjustable, rotative member, adjustable on its axis relatively to, and rotatable with, its companion member, said members having concentric bores of different diameters; a bolt extending through one of said reciprocating-heads and through the concentric bores of the clamping-members; and means for locking said members in frictional contact with each other, substantially as described.

7. In a chuck of the class described, the combination with two reciprocating-heads, one of said heads having a longitudinal recess and a transverse slot adjacent to said recess and communicating therewith; a rotatable clamping-jaw carried by said head and having an aperture in the face thereof adjacent to said head; and a clamping-jaw carried by the other reciprocating-head, and embodying a rotatable member, and an automatically and universally adjustable, rotative member, adjustable relatively to its companion member; and to the other jaw, and rotatable with its companion member; a spring-actuated bolt disposed in the longitudinal recess of the head, and adapted to engage the aperture in the rotatable clamping-jaw; a stem secured to said bolt and projecting through, and working in, the transverse slot, whereby said bolt can be actuated, substantially as described.

WILLIAM W. TUCKER.

Witnesses:
FRED. J. DOLE,
R. W. PITTMAN.